US006959186B2

(12) United States Patent
Zondag et al.

(10) Patent No.: US 6,959,186 B2
(45) Date of Patent: Oct. 25, 2005

(54) COMMUNICATION SYSTEM AND DEVICE FOR CONTROLLING A PLURALITY OF ELECTRONIC DEVICES

(75) Inventors: Eduard Gerhard Zondag, Eindhoven (NL); Dennis Van De Meulenhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 851 days.

(21) Appl. No.: 09/822,449

(22) Filed: Mar. 30, 2001

(65) Prior Publication Data

US 2001/0027099 A1 Oct. 4, 2001

(30) Foreign Application Priority Data

Apr. 4, 2000 (EP) .............................. 00201211

(51) Int. Cl.[7] .............................................. H04M 3/00
(52) U.S. Cl. ..................................................... 455/420
(58) Field of Search ............................... 455/420, 400; 709/223; 710/8, 18, 29, 31

(56) References Cited

FOREIGN PATENT DOCUMENTS

WO    WO9527357    2/1995

OTHER PUBLICATIONS

Peter M. Concoran, "Mapping Home–Network Appliances to TCP/IP Sockets Using a Three–Tiered Home Gateway Architecture", vol. 44, No.. 3, Aug. 1998, PG 729–736.

*Primary Examiner*—William D. Cumming

(57) ABSTRACT

A communication system with multiple clusters connected through gateways is provided. The first cluster has a controlled device, for which an abstract representation (AR) is provided as interface on a controlling device. To facilitate an application device in the second cluster interacting with the AR the system has a near proxy in the first cluster and a far proxy in the second cluster. The application device can interact with the AR via the far proxy, which communicates with the near proxy, which in turn interacts with the AR. Results are sent back to the application device in a similar fashion. An application device on a third cluster can interact with the AR via a further far proxy, which communicates with a further near proxy which in turn communicates with the far proxy.

10 Claims, 2 Drawing Sheets

Figure 1:
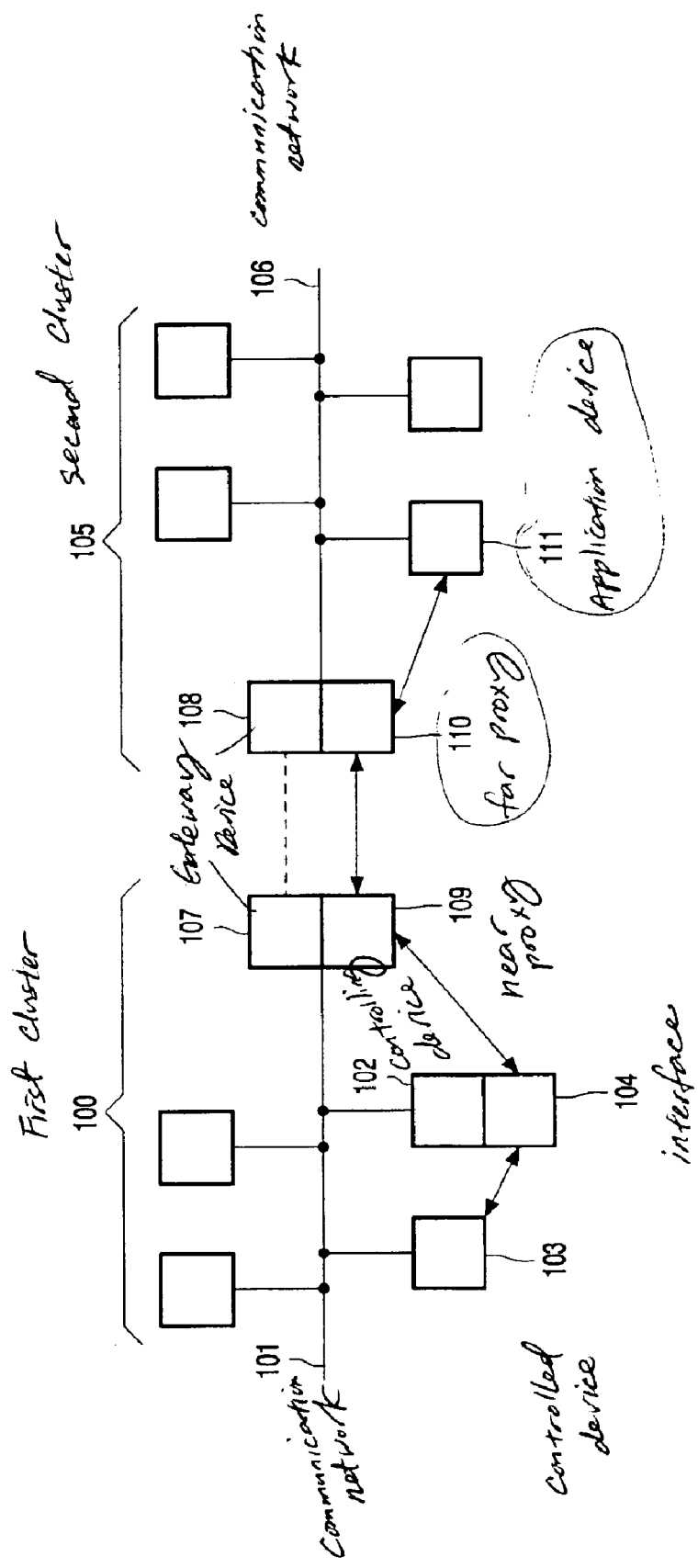

COMMUNICATION SYSTEM AND DEVICE FOR CONTROLLING A PLURALITY OF ELECTRONIC DEVICES

The invention relates to a communication system comprising a first cluster of interconnected devices, having at least a controlling device and a controlled device, functionality of the controlled device being associated with an abstract representation, referred to as AR, which provides an interface for controlling the controlled device, the AR for the controlled device being installed on the controlling device, the system further comprising a second cluster of interconnected devices, the first and second clusters being interconnected via respective gateway devices.

The invention further relates to a device for use in a communication system comprising a first cluster of interconnected devices, having at least a controlling device and a controlled device, functionality of the controlled device being associated with an abstract representation, referred to as AR, which provides an interface for controlling the controlled device, the AR for the controlled device being installed on the controlling device, the system further comprising a second cluster of interconnected devices, the first and second clusters being interconnected via respective gateway devices.

A communication system according to the preamble is described in the UK patent application 9921049.4 (PHB 34387) from the same applicant as the present application.

A typical home audiovisual system includes a number of devices, e.g. a radio receiver, a tuner/decoder, a CD player, a pair of speakers, a television, a VCR, a tape deck, and so on. These devices are usually interconnected to allow one device, e.g. the television, to control another, e.g. the VCR. One device, such as e.g. the tuner/decoder, is usually the central device, providing central control over the others. Control buttons and switches are usually located on the front of the tuner as well as on a handheld remote control unit. A user can control all devices by means of the central device or the remote control unit.

As these devices have become more versatile and more complex, simple manual control is no longer sufficient. Furthermore, as more and more devices become available, interoperability starts to become a problem. Many vendors use their own communication protocols to allow their devices to interact, but devices from different vendors cannot interact. To overcome these problems, several interoperability standards have been defined, which allow different devices to exchange messages and information and to control each other. One well-known standard is the Home Audio/Video Interoperability (HAVi) standard, version 1.0 of which was published in January 2000. Another well-known standard is the domestic digital bus (D2B) standard, a communications protocol described in IEC 1030.

In a system according to such a standard, devices are interconnected in a network using a standard bus, e.g. an IEEE 1394 serial communication bus, and exchange information, such as messages, data and commands, over this network according to the standard. Standards such as HAVi define the protocol for such exchanges, allowing devices from different vendors to interact. Users can add new devices to the network, and they immediately become available to other devices. The protocol for "discovering" such a new device is also standardized.

A device can act as a controlling device, thereby controlling another device, called the controlled device. For example, a tuner/decoder may control an amplifier or speakers. This type of control is typically done in a vendor-specific fashion, as it requires access to the internal hardware of the controlled devices. To allow arbitrary devices to interact with another device, standards such as HAVi or D2B define the concept of an abstract representation (AR), which provides an interface to the functionality of a controlled device. Application devices wishing to interact with a controlled device can now interact with the AR, installed on a controlling device, rather than directly with the controlled device itself. The controlling device then translates the information received from said application device into instructions, possibly in a proprietary fashion, which are sent to the controlled device. Any feedback from the controlled device is translated back and sent to the application device.

Communication systems of this kind are typically designed for use with a single bus. However, it may become necessary to interconnect two such systems, often referred to as clusters. To do this, a gateway device can be added to each cluster, and the gateway devices are interconnected to allow messages from one cluster to be transferred to another. The gateway devices can for example communicate over a wireless link, thereby preventing the user from having to add new wires to create one big cluster from the two existing clusters. Gateway devices can also be used when two clusters use different standards for exchanging messages, data and commands. The gateway devices then translate information from a first set of communication protocols to another and vice versa. Such a setup is sometimes referred to as a bridge, formed by the gateway devices, between the two clusters.

However, when interconnecting two clusters in this fashion, there is the problem that most standards assume that only a single cluster is used, and there is no provision for a device in a second cluster to interact with an AR in a first cluster. The UK patent application mentioned above solves this problem by installing this AR on another device in the second cluster, so that the device wishing to interact can do so in the ordinary fashion. The other device, holding the AR, communicates with the controlled device in the first cluster to provide seamless interaction between the device wishing to interact and the controlled device. The device holding the AR can be said to function as a proxy between the device wishing to interact and the controlled device.

A disadvantage of this approach is that the AR must be installed on a device in the second cluster before other devices on that cluster can use it. When there are many clusters or many devices with associated ARs, it is not practically possible to install all ARs on some device in every cluster. Furthermore, a direct link between the cluster having the controlled device and the cluster having the device wishing to use the controlled device is required in order to allow the controlling device to control the controlled device.

It is an object of the present invention to provide a communication system according to the preamble, in which devices on one cluster can access functionality on devices in another cluster in a flexible and efficient way.

This object is achieved according to the invention in a communication system that is characterized in that the system further comprises a near proxy on a device in the first cluster and a far proxy on a device in the second cluster, the near proxy being arranged to interact with the AR in dependence on information received from the far proxy and to transfer to the far proxy the results of said interacting, the far proxy being arranged to transfer to the near proxy information received from an application device in the second cluster and to interact with the application device in the second cluster in dependence on information received from the near proxy. By having these two proxies, an application device can interact with the AR for the controlled device in a transparent way, as the proxies ensure that messages, commands and information from the application device are passed on to the AR and vice versa.

In an embodiment the system is arranged to generate and to install the near proxy on a device in the first cluster and the far proxy on a device in the second cluster in response to the application device in the second cluster wishing to interact with the AR installed on the controlling device. An advantage of this embodiment is that the near and far proxies do not get installed before they are required, so that they do not unnecessarily use resources on the devices on which they are installed.

In a further embodiment the controlling device is arranged to generate and to transmit the near proxy and the far proxy to the respective devices on the first and second clusters. An advantage of this embodiment is that it is easy for the controlling device to generate the near and far proxy, as it knows the functionality of the device it controls, and can base the proxies on the AR it has installed for the device it controls.

In a further embodiment the system is arranged to remove the near proxy from the device in the first cluster and the far proxy from the device in the second cluster when the application device in the second cluster has ceased interacting with the far proxy. An advantage of this embodiment is that installed near and far proxies are now removed when they are no longer necessary, thereby freeing resources on the devices on which they were installed. The far proxy is best suited for detecting when the proxies are no longer necessary, as it can detect that the application device has ceased interacting with it.

In a further embodiment the system further comprises a third cluster of interconnected devices, the second and third clusters being interconnected via respective gateway devices, and in that the application device in the second cluster has a further near proxy being arranged to interact with the far proxy in dependence on information received from a further far proxy on the third cluster and to transfer to the further far proxy the results of said interacting. An advantage of this embodiment is that now a whole chain of proxies can be built, allowing devices on a faraway cluster to interact with devices in the first cluster.

In a further embodiment the device in a cluster on which a proxy is installed is a gateway device. An advantage of this embodiment is that the gateway devices are already interconnected, thereby saving the proxies from having to set up another interconnection to exchange information.

It is a further object of the present invention to provide a device according to the preamble, which can provide access to functionality on devices in its own cluster to devices in another cluster in a flexible and efficient way.

This object is achieved according to the invention in a device that is characterized in that the device is arranged to install a near proxy arranged to interact with the AR in dependence on information received from a far proxy and to transfer to the far proxy the results of said interacting In an embodiment the device is further arranged to remove the near proxy when an application device in the second cluster has ceased interacting with the far proxy.

It is a further object of the present invention to provide a device according to the preamble, which can allow access to functionality on devices in another cluster in a flexible and efficient way.

This object is achieved according to the invention in a device that is characterized in that the device is arranged to install a far proxy arranged to transfer to a near proxy information received from an application device in the second cluster and to interact with the application device in the second cluster in dependence on information received from the near proxy.

In an embodiment the device is further arranged to remove the far proxy when the application device in the second cluster has ceased interacting with the far proxy. An advantage of this embodiment is that an installed far proxy is now removed when it is no longer necessary, thereby freeing resources on the devices on which they were installed. The far proxy is best suited for detecting when it is no longer necessary.

Figure 2:
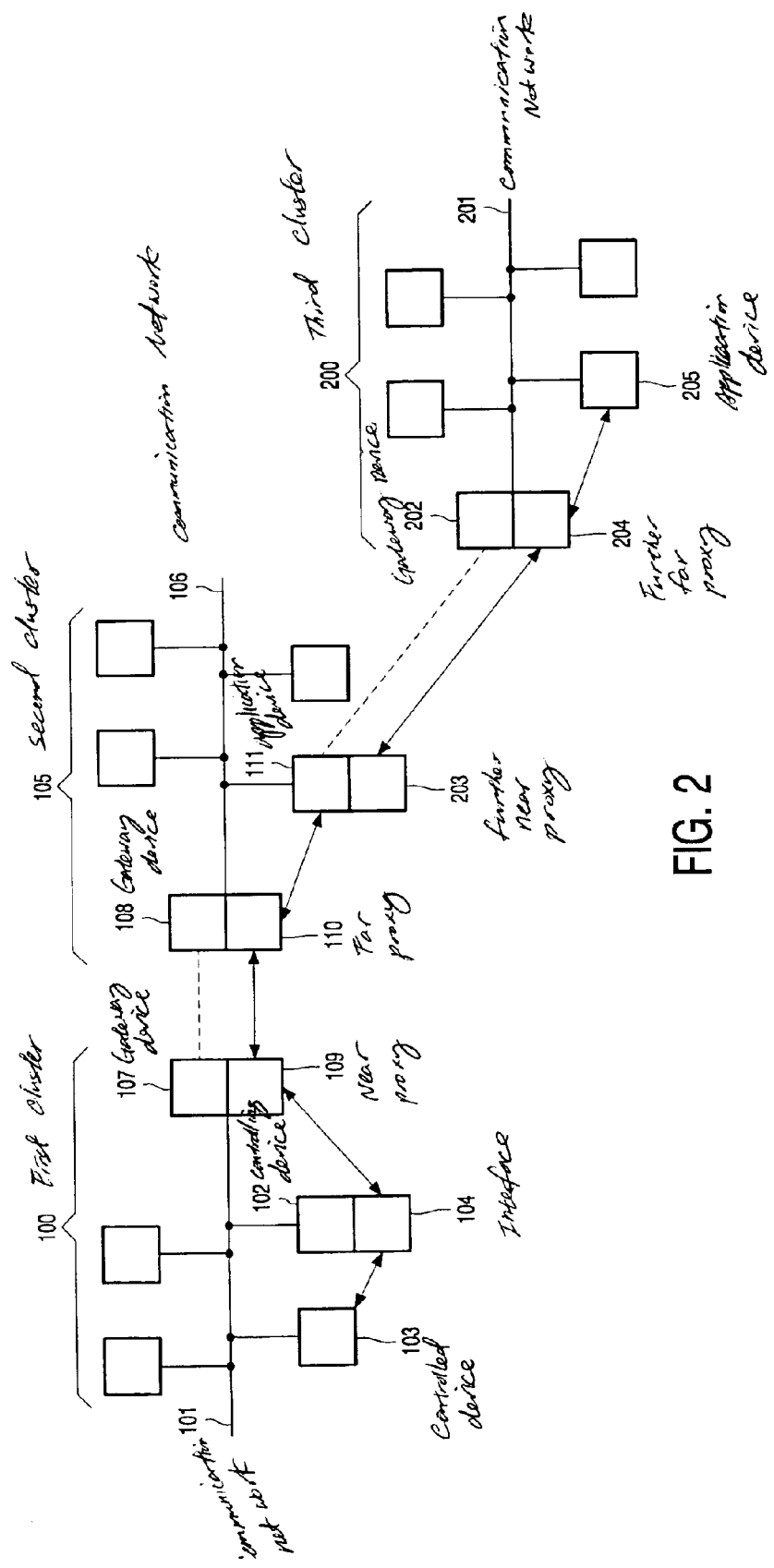

These and other aspects of the invention will be apparent from and elucidated with reference to the embodiments shown in the drawings, in which:

FIG. 1 is a block diagram of a system with a first and a second cluster of devices according to the invention; and FIG. 2 is a block diagram of a system with a first, a second and a third cluster of devices according to the invention.

Throughout the figures, same reference numerals indicate similar or corresponding features. Some of the features indicated in the drawings are typically implemented in software, and as such represent software entities, such as software modules or objects.

FIG. 1 is a block diagram of a communication system comprising a first cluster 100 and a second cluster 105 of devices according to the invention. The devices in the first cluster are interconnected via a communication network 101, for instance based on IEEE 1394, using the same higher-level communication protocols. The devices in the second cluster are similarly connected via a communication network 106. The first and second clusters 100, 105 are themselves interconnected via respective gateway devices 107, 108, where gateway device 107 resides in the first cluster 100 and gateway device 108 in the second cluster 105. There is some kind of communication network between the gateway devices 107, 108, over which information such as messages, data and commands can be sent from one cluster to the other. This network can be any type of network, for example a wireless link. It is possible that the first cluster 100 and the second cluster 105 use different communication protocols in their respective communication networks. In that case, the gateway devices 107, 108 must be arranged to translate messages received from the first cluster 100 to the protocol used in the second cluster 105, and vice versa.

The first cluster 100 has amongst other devices a controlling device 102 and a controlled device 103. The functionality of the controlled device 103 is made available through an interface 104, called an abstract representation (AR). This interface is installed on the controlling device 102. The interface is made available through the API (Application Program Interface) of this AR. This API is the access point for applications to control the controlled device. For instance, an intelligent television in the family room might be the controlling device for a number of controlled devices. A controlled device could contain code that constructs a user interface for the controlled device and allows external control of the controlled device. When such a device is first connected, the controlling device, e.g. said intelligent television, obtains the user interface and control code. An icon representing the controlled device may then appear on the television screen, and manipulating the icon may cause elements of the control code to actuate the represented device or devices in prescribed ways. It should be noted that it is possible that the controlled device 103 and the controlling device 102 are realized in one physical device.

While in reality there is a smoother continuum of device capabilities than is acknowledged here, the following categorization is useful in understanding the model of this system. The communication capabilities of the devices in this generic example have different levels of sophistication. Dependent on their communication capabilities, the devices belong to one of the following classes:

Controlling Devices:

A distinction can be made between the following two types of controlling devices:

Full AV Device (FAV)

A Full AV device generally has a rich set of resources and is capable of supporting a complex software environment. The primary distinguishing feature of a FAV device is the presence of a runtime environment for executing an abstract representation (AR) for a controlled device. This allows a FAV device to upload an AR from other devices or via other local area or wide area communication networks and to so provide enhanced capabilities for their control. The FAV device may also be able to download applications/features. Preferably, the downloaded code is some form of executable code of a virtual machine, e.g. Java or similar bytecodes. Likely candidates for FAV devices are Set Top Boxes (STB), digital TV receivers (DTV), general-purpose home control devices, and even home PCs.

Intermediate AV Device (IAV)

Intermediate AV devices are generally lower in cost than FAV devices and more limited in resources. They do not provide a runtime environment for downloadable ARs and so cannot act as controlling devices for arbitrary devices within the system. However, an IAV device may provide native support for control of particular controlled device(s) in the system.

Controlled Devices

A distinction can be made between the following two types of controlled devices:

Base AV Device (BAV)

These are devices that, for business or resource reasons, choose to implement future-proof behavior by providing an uploadable AR, but the devices themselves do not execute an AR. These devices can be controlled by a controlling device, by a FAV device via the uploadable bytecode or by an IAV device via native code. The protocol between the BAV device and its controlling device typically is proprietary. Communication between a controlling device and a BAV device requires that commands for the AR are translated to and from the command protocol used by the BAV device. This translation is performed by the controlling device executing the AR.

Legacy AV Device (LAV)

LAV devices are devices that do not comply with the described system architecture and communication protocols. Typically, such devices were built earlier. These devices use proprietary protocols for their control, and usually have simple control-only protocols. Such devices can work in the home network but require that FAV or IAV devices act as a gateway. Communication between a Full or Intermediate AV device and a legacy AV device requires that commands be translated to and from the legacy command protocol.

During the course of interaction, devices may exchange messages, commands and data in a peer-to-peer fashion. This ensures that, at the communication level, no one device is required to act as a master or controller for the system. However, it also allows a logical master or controller to impose a control structure on the basic peer-to-peer communication model.

The AR is a software element used to control a device. An AR may comprise code for the AR itself. It may also comprise code for Functional Component Modules (FCMs) for each functional component within the controlled device. An FCM is a (software) abstraction of a functional component providing the functionality of that functional component to the software environment and applications. Other devices do not communicate with a functional component directly but only through the FCM. An FCM is an object in the sense that it may be registered as a receiver in a registry (details are provided below) and that it can communicate with other objects via a messaging system. A functional component represents functions associated with one identifiable main function of a device. E.g. a VCR AR may comprise separate FCMs for the tape deck and the tuner; a TV AR may comprises separate FCMs for the monitor, PIP (picture in picture display) and tuner. In addition an AR may include a device control application—a software element allowing user control of the device and its functional components.

To allow other devices to locate and access functionality contained in an AR, the system maintains a registry containing identifiers which can be used to locate all devices in the system. Devices can query the registry to find out the devices and functional components available and to get a software element identifier to allow them to interact with the device via the AR and the FCMS. In a system using the HAVi standard, this registry is restricted to a single cluster, but there are many ways to provide devices in one cluster access to the registry in another cluster. For example, the gateway devices 107, 108 could transfer registry information from their respective clusters 100, 105 to the other cluster, or pass on messages intended for the local registry to the other cluster so that the other registry also gets updated. Alternatively, the gateway device 108 could be arranged to pass on queries for the registry originating in the second cluster 105 to the gateway device 107 in the first cluster 100, where the query can be answered. The results are then transferred back to the second cluster 105. A global registry, accessible in all clusters, could also be provided.

ARs are handled by a FAV device or IAV device that can install them. Installation of an AR code unit results in the installation of all the associated FCMs. The code can be written in a standard bytecode, in which case they can be installed on all FAV devices, or in some native code, in which case they can be installed only on (and by) some FAV or IAV that knows that code and is prepared for that kind of code.

In the system according to the invention, an application device 111 in the second cluster 105 can interact with the AR 104 installed on the controlling device 102 in the first cluster 100. For instance, the application device 111 can be a remote control unit which is intended to be used for interacting with a VCR. The VCR is connected to and controlled by an intelligent television. In this case, the intelligent television is the controlling device 102, controlling the VCR, said VCR being the controlled device 103. The application device 111 must first locate the controlling device 102 having an AR 104 with the desired functionality. This is done by accessing the registry as described above.

The system further comprises a near proxy 109 installed on a device in the first cluster 100 and a far proxy 110 installed on a device in the second cluster 105. Preferably, these devices are the gateway devices 107, 108, as this allows for easy communication between the near proxy 109 and the far proxy 100. The near proxy 109 and the far proxy 110 are typically implemented in software. The far proxy 110 transfers to the near proxy 109 information, such as messages, data and commands, received from the application device 111 and interacts with the application device 111 in dependence on information received from the near proxy 109. From the point of view of the application device 111, the far proxy 110 behaves similar to how the AR 104 would behave, as commands sent to it function similarly to commands sent to the AR 104. To do this, the far proxy 110 provides the same basic interface as the AR 104, and it transfers messages, data and commands received from the application device 111 to the near proxy 109.

The near proxy 109 interacts with the AR 104 installed on the controlling device 102 in dependence on information received from the far proxy 10 and transfers the results of said interacting to the far proxy 110. From the point of view of the AR 104, the near proxy 109 behaves similar to how the application device 111 would do, as it receives information from the near proxy 109 and can send its own output back to it. To do this, the near proxy 109 passes on messages, data and commands received from the far proxy 110 to the AR 104, and it transfers the results back to the far proxy 100, which then transfers them further to the application device 111. Thus, the near proxy 109 and the far proxy 110 provide a substantially transparent mechanism for the application device 111 to interact with the AR 104.

The system must generate the code for the proxies and install them on the appropriate devices, which must be arranged to install such a proxy. This generation is preferably done by the controlling device 102, as this device has access to the AR 104 and the controlled device 103. The code for generating the proxies 109, 110 can be based on the code for the AR, which the controlling device 102 can access and transmit to the appropriate devices 107, 108. The controlled device 103 may contain code for generating the proxies 109, 110, which is then accessed by the controlling device 102 and uploaded to the devices 107, 108. Alternatively, the code for the proxies 109, 110 may be obtained from some other device on the network, or even from a server outside the network, for instance by downloading it from the Internet. The actual installing can be performed using the known mechanism present in controlling devices for uploading ARs. It may be desirable to not install the near proxy 109 and the far proxy 110 when the system is activated, or when the controlled device 103 is added to the first cluster 100, but to wait with installing them until the application device 111 indicates that it wishes to interact with said controlled device 103.

When the proxies 109, 110 are installed in the above dynamic fashion, it is similarly advantageous to remove them once they are no longer needed. This can be detected by the far proxy, as it can detect when the interaction with the application device 111 has ceased. A far proxy 110 can be capable of handling more than one application device 111 at a time. In that case, the near and far proxies 109, 110 should not be removed until all application devices 111 have ceased interacting with the far proxy 110. Of course the proxies 109, 110 can also be removed when the controlled device 103 is disconnected from the network. The actual removing can be performed using the known mechanism present in controlling devices for removing uploaded ARs.

To illustrate how the above mechanism using proxies can be extended, FIG. 2 shows a block diagram of a system with a first, a second and a third cluster 100, 105, 200 of devices according to the invention. Devices in the third cluster 200 are interconnected via a communication network 201, similar to the devices in the first and second clusters 100, 105. The second and third clusters 105, 200 are interconnected via respective gateway devices 111, 202. The reader will appreciate that the gateway device 111 is the same device as the application device 11 in FIG. 1, showing how easily this mechanism can be extended. As will become apparent below, it makes no difference for the near and far proxies 109, 110 whether the application device 111 is interacting with the AR 104 for itself or on behalf of another application device.

In the description accompanying FIG. 1, the application device 111 was shown interacting with the AR 104 through the near proxy 109 and the far proxy 110. However, it is also possible that an application device 205 in the third cluster 200 wishes to interact with the AR 104 in the first cluster 100. As there is no direct connection between the first cluster 100 and the third cluster 200, such interaction will have to pass through the second cluster 105. Part of the mechanism necessary for this interaction is already in place, in the form of the near proxy 109 and the far proxy 110. Now, there are a further near proxy 203 in the second cluster 105 and a further far proxy 204 in the third cluster 200. The further near proxy 203 is shown in FIG. 2 as installed on the application device 111, although of course it can be installed on any device in the second cluster 105.

Similar to the near proxy 109, the further near proxy 203 is arranged to interact with the far proxy 110 in dependence on information received from the further far proxy 204 and for transferring to the further far proxy 204 the results of said interacting. The further far proxy 204 interacts with the application device 205 in the same fashion as the far proxy 110 does with the application device 111 in FIG. 1. Thus, the near proxy 109, the far proxy 110, the further near proxy 203 and the further far proxy 204 provide a transparent mechanism for the application device 205 to interact with the AR 104 in the first cluster 100.

The mechanism as described above can be further extended in an unlimited way. The application device 205 can in turn act as another near proxy, communicating with another far proxy on yet another cluster. This other far proxy can in turn be interacting with an application device, or with a device on with yet another near proxy is installed. It should become apparent that this allows a whole chain of proxies to be constructed, allowing application devices in any cluster to interact with controlled devices in any other cluster.

It is possible that two or more far proxies communicate with the same near proxy, allowing multiple application devices to simultaneously interact with one controlled device. Multiple near or far proxies can be installed on one device. This can give a whole tree topology of clusters, interconnected by respective gateway devices, and having a plurality of near and far proxies in each cluster. Application devices in any cluster can interact with controlled devices in any other cluster through a given path in said tree, formed by a number of interconnected near and far proxies.

What is claimed is:

1. A communication system comprising a first cluster (100) of interconnected devices, having at least a controlling device (102) and a controlled device (103), functionality of the controlled device (103) being associated with an abstract representation (AR), which provides an interface for controlling the controlled device, the AR (104) for the controlled device (103) being installed on the controlling device (102), the system further comprising a second cluster (105) of interconnected devices, the first and second clusters (100, 105) being interconnected via respective gateway devices (107, 108), wherein the system further comprises a near proxy (109) on a device in the first cluster (100) and a far proxy (110) on a device in the second cluster (105), the near proxy (109) being arranged to interact with the AR (104) in dependence on information received from the far proxy (110) and to transfer to the far proxy (110) the results of said interacting, the far proxy (110) being arranged to transfer to the near proxy (109) information received from an application device (111) in the second cluster (105) and to interact with the application device (111) in the second cluster (105) in dependence on information received from the near proxy (109).

2. The communication system according to claim 1, wherein the system is arranged to generate and to install the near proxy (109) on a device in the first cluster (100) and the far proxy (110) on a device in the second cluster (105) in response to the application device (111) in the second cluster (105) wishing to interact with the AR (104) installed on the controlling device (102).

3. The communication system according to claim 2, wherein the controlling device (102) is arranged to generate and to transmit the near proxy (109) and the far proxy (110) to the respective devices on the first and second clusters (100, 105).

4. The communication system according to claim 2 or 3, wherein the system is arranged to remove the near proxy (109) from the device in the first cluster (100) and the far proxy (110) from the device in the second cluster (105) when the application device (111) in the second cluster (105) has ceased interacting with the far proxy (110).

5. The communication system according to claim 1, wherein the system further comprises a third cluster (200) of interconnected devices, the second and third clusters (105, 200) being interconnected via respective gateway devices (111, 202), and in that the application device (111) in the second cluster (105) has a further near proxy (203) being arranged to interact with the far proxy (110) in dependence on information received from a further far proxy (204) on the third cluster (200) and to transfer to the further far proxy (204) the results of said interacting.

6. The communication system according to claim 1, wherein the device in a cluster on which a proxy is installed is a gateway device.

7. A device for use in a communication system comprising a first cluster (100) of interconnected devices, having at least a controlling device (102) and a controlled device (103), functionality of the controlled device (103) being associated with an abstract representation (AR), which provides an interface for controlling the controlled device, the AR (104) for the controlled device (103) being installed on the controlling device (102), the system further comprising a second cluster (105) of interconnected devices, the first and second clusters (100, 105) being interconnected via respective gateway devices (107, 108), wherein the device is arranged to install a near proxy (109) arranged to interact with the AR (104) in dependence on information received from a far proxy (110) and to transfer to the far proxy (100) the results of said interacting.

8. The device according to claim 7, wherein the device is further arranged to remove the near proxy (109) when an application device (111) in the second cluster (105) has ceased interacting with the far proxy (110).

9. A device for use in a communication system comprising a first cluster (100) of interconnected devices, having at least a controlling device (102) and a controlled device (103), functionality of the controlled device (103) being associated with an abstract representation (AR), which provides an interface for controlling the controlled device, the AR (104) for the controlled device (103) being installed on the controlling device (102), the system further comprising a second cluster (105) of interconnected devices, the first and second clusters (100, 105) being interconnected via respective gateway devices (107, 108), wherein the device is arranged to install a far proxy (110) arranged to transfer to a near proxy (109) information received from an application device (111) in the second cluster (105) and to interact with the application device (111) in the second cluster (105) in dependence on information received from the near proxy (109).

10. The device according to claim 9, wherein the device is further arranged to remove the far proxy (110) when the application device (111) in the second cluster (105) has ceased interacting with the far proxy (110).

* * * * *